Dec. 26, 1967 J. T. H. CHANG ET AL 3,360,787

SINGLE SHEET MAGNETIC MEMORY DEVICE

Filed May 7, 1964 2 Sheets-Sheet 1

INVENTORS
J. T. H. CHANG
U. F. GIANOLA
BY Herbert M. Shapiro
ATTORNEY

Dec. 26, 1967 J. T. H. CHANG ET AL 3,360,787

SINGLE SHEET MAGNETIC MEMORY DEVICE

Filed May 7, 1964 2 Sheets-Sheet 2

3,360,787

SINGLE SHEET MAGNETIC MEMORY DEVICE

James T. H. Chang, New Providence, and Umberto F. Gianola, Florham Park, N.J., assignors to Bell Telephone Laboratories, Incorporated, New York, N.Y., a corporation of New York Filed May 7, 1964, Ser. No. 365,588

8 Claims. (Cl. 340—174)

This invention relates to magnetic memories and, more particularly, to magnetic memories including a plurality of bit locations defined on a single sheet of magnetic material having substantially rectangular hysteresis characteristics.

The formation of bit locations on a single sheet of such magnetic material is accomplished by well known, high speed techniques which lend themselves to miniaturization. Thus, memories including single sheet memory planes are highly promising from a commercial standpoint. One problem which has limited comercial acceptance of such single sheet memory planes is that flux switched in one bit location may find closure through, for example, an adjacent bit location rather than through magnetic paths provided for flux closure purposes within the same bit location. This problem is particularly troublesome in structures the efficacy of which depends on flux being routed through prescribed flux closure paths therein. Not only is the operation of such a structure compromised by the failure of flux to close through the prescribed path, but also the misdirected flux closing through an adjacent bit location causes various problems commonly known as "interaction effect." All these problems are most acute in miniaturized memory planes where adjacent bit locations are in close proximity to one another.

Various techniques have been proposed for providing control over flux routing and for overcoming the interaction effects. One proposal is to cut slots between the bit locations. Such slots, however, are relatively expensive to form, weaken the physical structure, and are difficult to bridge by electrical conductors formed, most expeditiously, by well known photo-plating techniques. Another proposal requires that stringent controls be placed on drive currents applied to address the memory thereby limiting the influence thereof to localized regions about the bit locations. This type of control limits the operation margins and practically never entirely avoids interaction effects.

An object of this invention is to provide a new and novel single sheet, magnetic memory plane wherein positive control over flux routing is provided and interaction effects are substantially avoided.

The above and further objects of this invention are realized in one embodiment thereof wherein each bit location is designed and coupled by drive conductors in a manner to provide symmetrical flux closure therein for flux switched in centrally located legs. Switching within the bit location in this manner provides positive control over flux closure therein. In keeping with this symmetrical operation, information is stored in flux closure paths at the ends of the bit location in response to flux switching in the central legs of the bit location. The information is sensed by interrogating the flux closure paths at one or both ends.

Accordingly, a feature of this invention is a magnetic bit location including symmetrical flux closure paths for flux switched only in the central portion thereof.

Another feature of this invention is the coupling of conductors to a central portion of a symmetrical bit location of a single sheet, magnetic memory plane for switching flux therein in a manner such that flux closure occurs symmetrically through the end portions.

The above and further objects and features of this invention will be understood more fully in connection with the following description rendered in connection with the accompanying drawing wherein.

Figure 1:
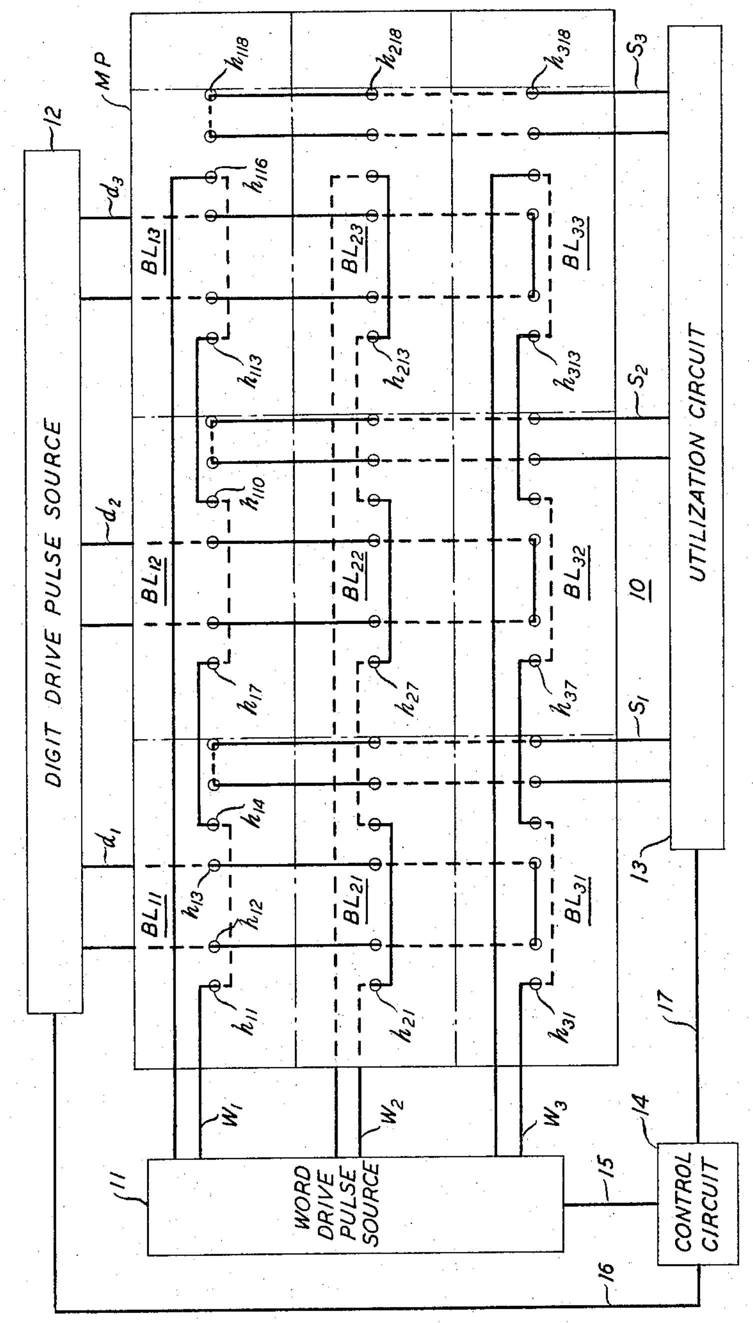
FIG. 1 is a word-organized memory including a single sheet, magnetic memory plane in accordance with this invention.

FIG. 1 shows an illustrative word-organized single sheet memory 10 in accordance with this invention. The memory comprises a memory plane MP in which linear arrays of holes $h$, typically one mil in diameter, are provided. The material of the memory plane has substantially rectangular hysteresis characteristics, and each hole defines a flux-carrying magnetic path in the magnetic material thereabout. The holes are aligned generally in three rows which, as will be discussed hereinafter, define the information words of the memory. Accordingly, each hole designation includes a first subscript 1, 2, and 3, corresponding to the word in which it is located. The separation between holes will be discussed in connection with the description of the operation of the memory hereinafter.

The various holes of the memory plane are threaded by a plurality of conductor sets which organize the storage of information in the memory plane. The conductors of one of these conductor sets are designated word conductors $w_1$, $w_2$, and $w_3$. In this connection, the designations for the various conductors and elements of the memory are in keeping with the generally accepted terminology of word-organized memories. Each word conductor is connected at both ends to a word drive pulse source 11, threading, in an alternating sense, the first hole and every third hole thereafter of one row of holes. Word conductor $w_1$ so threads the holes designated $h_{11}$, $h_{14}$, $h_{17}$, $h_{110}$, $h_{113}$, and $h_{116}$; $w_2$ threads the corresponding holes designated $h_2$, and $w_3$ threads those designated $h_3$, the sense of the word conductor $w_2$ is opposite to that of word conductors $w_1$ and $w_3$. The word conductors, as can be seen at a glance at FIG. 1, impart to the memory plane a certain symmetry which divides the holes of each row into a plurality of bit locations each including six holes. Thus, the illustrative memory is organized into three words each including three bit locations. Each word conductor, then, can be thought of as threading in opposing sense the first and fourth holes of each bit location in a word. The bit locations are designated $BL_{11}$, $BL_{12}$, . . . , and $BL_{33}$, the subscripts of each designation corresponding to the word and to the one of another set of conductors, termed digit conductors, coupled to the bit location so designated.

The digit conductors are oriented generally orthogonally with respect to the word conductors threading corresponding holes in each row. Specifically, each digit conductor, for example, conductor $d_1$, is connected at both ends to a digit drive pulse source 12, threading in an alternating sense the second hole in each of the bit locations $BL_{11}$, $BL_{21}$, and $BL_{31}$ in sequence, and then threading in an alternating sense the third holes of those bit locations in the opposite sequence. An examination of any one bit location reveals that the digit conductor threads the second and third holes therein in opposite senses.

All the bit locations threaded by a single digit conductor are also threaded by a single sense conductor $s$ bearing a subscript corresponding to that of the digit conductor. Specifically, each sense conductor $s_1$, $s_2$, and $s_3$, connected at both ends to a utilization circuit 13, threads, in an alternating sense, the fifth holes and then the sixth holes in the bit locations threaded by the digit conductor bearing the same subscript.

The word drive pulse source 11, the digit drive pulse source 12, and utilization circuit 13 are connected to a control circuit 14 by means of conductors 15, 16, and 17, respectively. In this connection, the drive pulse sources, the control circuit and the utilization circuits may be any sources and circuits, respectively, capable of performing as required in accordance with this invention.

Since the memory of FIG. 1 is a word-organized memory, the storage therein of an illustrative word 101 will be described. Each of the bit locations in the memory, moreover, stores information in the same manner. Accordingly, the storage and sensing of a binary "1" and a binary "0" will be described in connection with a representative bit location for example, $BL_{11}$, and then extended in accordance with the assumed illustrative word 101.

Figure 2:
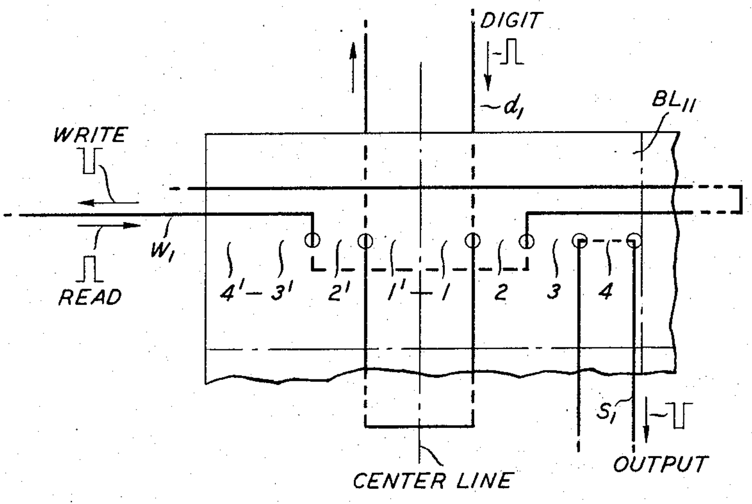
FIG. 2 is a representative bit location of the memory of FIG. 1.

FIG. 2 shows the bit location $BL_{11}$ which may be taken as a representative bit location of the memory of FIG. 1. The limits of the bit location $BL_{11}$ are demarcated by the broken line so designated and the boundary of the memory plane thereabout as shown in FIG. 1, as well as in FIG. 2. The magnetic legs defined by the holes of the bit location are designated 4′–3′, 2′, 1′–1, 2, 3, and 4, from left to right, as viewed in FIG. 2. This designation of the legs is employed to emphasize the symmetry within the bit location about an imaginary center line represented by the vertical broken line, so designated, through leg 1′–1. The minimum cross-sectional areas of the legs designated by a single numeral are substantially equal, the holes being spaced, for example, 3 mils apart. Those designated by a hyphenated pair of numerals have minimum cross-sectional areas substantially twice those of the first mentioned legs. These latter legs may include a hole therein dividing the legs into two paths with equal minimum cross-sectional areas. They are shown as undivided legs in the described embodiment, however.

Figure 3:
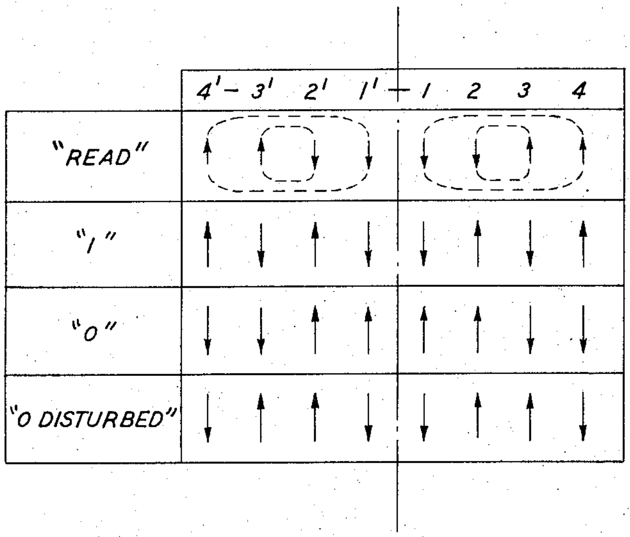
FIG. 3 is a chart of the flux conditions to which the representative bit location is driven during the operation of a memory in accordance with this invention.

Initially, the flux in the representative bit location is set to the flux condition shown in FIG. 3 in the first row designated the "read" condition. Specifically, a positive pulse, herein termed the "read" pulse, is applied to conductor $w_1$ as indicated by the arrow shown in FIG. 2. In this connection, a positive pulse is one in which current flows outward from its source. Because both ends of the conductors illustrated herein are connected to the same elements, the polarity designations for the various pulses are with respect to the end of the conductor with which the numeral designation is associated. This is indicated by the various pulse forms shown in FIG. 2 adjacent the word, digit and sense conductors. This positive pulse is applied by the word drive pulse source 11 under the control of control circuit 14. A pulse of this polarity drives the flux upward in legs 4′–3′, and 3, and 4, and downward in legs 2′, 1′–1, and 2, as shown by the arrows of the first row of FIG. 3. In this connection, one arrow may be taken as representing a single unit of flux. One rationalization of flux closure through the bit location is illustrated by the broken curved lines connecting the arrows in the first row of FIG. 3. These broken lines are merely to demonstrate that flux is conserved through the bit location and is not meant to suggest the only possible mode of flux closure within the bit location. It may be noted that, if the first row of FIG. 3 were folded about the vertical broken line (center line), the flux pattern to either side thereof would be a mirror image of the other. It will be demonstrated that such symmetry is preserved during the entire operation in accordance with this invention and that flux closures are confined, for all practical purposes, to the paths shown.

A binary "1" is stored in the representative bit location by applying coincidently, a negative and a positive pulse to word conductor $w_1$ and digit conductor $d_1$, respectively. These pulses are provided by means of drive pulse sources 11 and 13, respectively, under the control of control circuit 14. The negative pulse, herein termed the "write" pulse, on the word conductor, tends to reverse all the flux in the bit location from its condition at the termination of the "read" pulse. In this connection, a negative pulse is one in which current flows towards a source. The positive pulse, herein termed the "digit" pulse, applied to the digit conductor $d_1$ inhibits the flux in leg 1′–1 from switching. In this connection, the digit pulse is chosen to have an amplitude at least sufficient to so inhibit flux switching by the "write" pulse in leg 1′–1. As a result of the application of coincident "write" and digit pulses, a flux reversal takes place in legs 2′ and 2 with closure provided by symmetrical switching in the immediately adjacent portion of leg 4′–3′ and through leg 3, respectively. Flux reversal is inhibited in legs 1′–1, as previously noted. The remote portion of leg 4′–3′, represented by the left-hand arrow therein, as viewed in FIG. 3, and leg 4 therefore maintained substantially the same magnetic condition to which it was set by the read pulse. The resulting flux condition is shown in the second row of FIG. 3 labeled "1." As can be seen there, the flux in leg 4′–3′ is neutral, one arrow being directed upward, the other downward. The flux in each of legs 2′, 2 and 4 is directed upward; the flux in each of legs 1′–1, and 3 is directed downward. The directions are as viewed in FIG. 3. A glance at FIG. 3, row 2, shows that symmetry about the center line is preserved for the flux pattern representing a binary "1." Once again we should note that the flux closures are confined for all practical purposes as shown.

A binary "0" is stored in the representative bit location by applying a negative "write" pulse to the word conductor $w_1$ in the absence of the inhibiting "digit" pulse. The "write" pulse again is applied by means of the word drive pulse source under the control of control circuit 14. In the absence of a coincident "digit" pulse, all the flux in the bit location is reversed from the condition at the termination of the read pulse. The resulting flux condition is shown in row 3 of FIG. 3, the flux in legs 4′–3′, 3, and 4 being directed downward, and the flux in legs 2′, 1′–1, and 2 being directed upward. Again, these directions are as viewed in FIG. 3. It is quickly observed that symmetry about the center line is preserved for the binary "0" condition also.

A binary "1" is read out of the representative bit location of FIG. 2 by applying a positive "read" pulse to the word conductor $w_1$. The resulting flux condition is shown in row 1 of FIG. 3 and was discussed hereinbefore. Importantly, the flux in legs 2′, 1′–1, and 2 is driven downward, requiring in turn, the flux in legs 4′–3, 3 and 4 to switch upward in response to the read pulse. All directions are as viewed in FIG. 3. For a stored "1," the flux in leg 1′–1 already is directed down and experiences only insignificant shuttling of flux in response to the read pulse. The flux in legs 2′ and 2 switches downward, however, and, in turn, leg 4′–3′ switches from neutral to the upward condition, leg 3 switches from the downward to the upward condition, and leg 4 remains in the upward condition, as viewed in the figure. Since the sense conductor couples only leg 4, no significant pulse is induced in the sense conductor $s_1$ in reading out a binary "1."

A binary "0" is read out of the representative bit location, in response to the "read" pulse, as a negative pulse in the sense conductor $s_1$. An examination of row 3 of FIG. 3 indicates that for a binary "0" the flux in each of legs 4′–3′, 3, and 4 is directed downward as viewed in the figure. The "read" pulse in driving flux downward in legs 2′, 1′–1, and 2 requires, in turn, reversal of flux in these first mentioned legs. Thus, flux is reversed in leg 4 inducing a negative pulse in the sense conductor $s_1$ attached thereto. It is to be understood that the designation of the binary values may be reversed and an output pulse may be realized in reading out a binary "1" rather than a binary "0" as described.

The above discussion can be extended to the storing of the assumed illustrative word 101 in the bit locations $BL_{11}$, $BL_{12}$, and $BL_{13}$ as follows. In response to a positive "read" pulse applied to word conductor $w_1$, all these bit locations are set to the flux condition shown in row 1 of FIG. 3 as discussed hereinbefore. Next, a negative pulse is applied to word conductor $w_1$ and, simultaneously, positive pulses are applied only to digit conductors $d_1$ and $d_3$, no pulse being applied to digit conductor $d_2$ at this time. These pulses are applied as described hereinbefore. As a result, a binary "1" is stored in each of bit locations $BL_{11}$ and $BL_{13}$, and a binary "0" is stored in bit location $BL_{12}$. The information is read out in parallel in response to a subsequent positive "read" pulse applied, as described, to word conductor $w_1$. In response thereto, a negative pulse is induced in conductor $s_2$ and a null (or an insignificant pulse) is induced in each of conductors $s_1$ and $s_3$.

It is important to the operation of a word-organized memory that a digit pulse applied to write a "1" into a bit location of a selected word does not disturb the information settings of corresponding bit locations of other words. It is clear from an inspection of FIGS. 2 and 3 that a digit pulse applied alone cannot modify the setting of a corresponding bit location of another word if that bit location contains a "1." This is true because the digit pulse merely drives the flux in the effected legs of that bit location toward the direction in which the legs are already saturated. If that bit location contains a "0," the flux in the leg 1′–1 thereof is reversed, in response thereto, from the upward to the downward condition, requiring in turn the reversal of flux in the adjacent portion of leg 4′–3′ and in legs 3 from the downward to the upward condition in order to maintain the necessary flux closure within the bit location. The resulting flux pattern is designated the "0 disturbed" condition and is shown in row 4 of FIG. 3. The "0 disturbed" condition may be avoided merely by limiting the amplitude of the digit pulse to below the threshold for unselected bit locations. Such a limitation, however, is unnecessary in accordance with this invention. An examination of the "0 disturbed" condition reveals that, for all practical purposes, the magnetic condition in leg (4′ or) 4 of the so effected bit location is the same as it would be if a "0" were stored therein. Since leg (4′ or) 4 is the only leg coupled by the sense conductor, the output pulse for a "0" and a "0 disturbed" are essentially the same, and subsequent disturbing digit pulses do not result in loss of information regardless of the amplitudes thereof. As with all previous input conditions, flux switching in response to such disturbing digit pulses is, for all practical purposes, self confining.

Importantly, in response to positive or negative pulses applied to, for example, the word conductor $w_1$, flux switches counterclockwise and clockwise, respectively, about the first hole in each bit location, and vice versa, about the fourth hole there. If the pattern of the word conductor in FIG. 1 is examined, it is realized that only the legs 2′, 1′–1, and 2 in each bit location are coupled thereby. These legs are the central legs of the bit location and flux switched therein closes about the shortest available paths. Thus, flux switching, in accordance with this invention, is in the central part of a bit location, and flux closure is provided at the ends of the bit location, the spacing between rows of holes being sufficient to permit such flux closure. In this manner positive control over flux closure is provided within bit locations during operation in accordance with this invention, and interaction effects are substantially avoided.

It may be appreciated by one skilled in the art that the flux closure patterns appearing in one of the symmetrical halves of a bit location of the described embodiment correspond to those of an inhibited flux structure of the type described in Patent No. 2,926,342, issued Feb. 23, 1960, to J. L. Rogers. The flux closure patterns of the other half correspond to those of its mirror image. The symmetrical operation thereof permits the advantages in accordance with this invention. Similar symmetry considerations permit the mapping of other multiapertured, magnetic elements onto single sheet memory planes while providing control over flux routing therein and avoiding interaction effects therebetween.

Not only is the described embodiment fabricated easily by well known electron beam drilling equipment but it is characterized by a further advantage that only one conductor is threaded through a hole. This permits the use of photo-deposition techniques for forming the conductors on the surfaces of the memory plane. Furthermore, it can be seen in FIG. 1 that no two conductors intersect, and, consequently, it is not necessary to insulate one conductor from another. Thus, memory planes, in accordance with this invention, can be fabricated, advantageously, with high speed, automatic techniques. Bit densities of 1800 per square inch are achieved in this manner.

No effort has been made to exhaust the possible embodiments of this invention. It will be understood that the embodiment described is merely illustrative and various modifications may be made therein without departing from the scope and spirit of the invention.

What is claimed is:

1. A magnetic memory including an element comprising magnetic material having substantially rectangular hysteresis characteristics, said element being apertured to include a central portion and first and second end portions, each of said end portions accommodating substantially one-half the maximum amount of flux accommodated by said central portion, means coupled to said central portion of said element for selectively driving the flux in said central portion to a first flux condition, means coupled to said central portion of said bit location for driving the flux in said central portion to a second flux condition, and means coupled to said second end portion of said element for detecting the switching of flux in said central portion from said first to said second flux condition.

2. A magnetic memory including a memory plane, said memory plane comprising magnetic material having substantially rectangular hysteresis characteristics, said memory plane being apertured to provide a plurality of bit locations therein, each of said bit locations including a central portion and first and second end portions, each of said end portions accommodating substantially one-half the maximum amount of flux accommodated by said central portion, means coupled to said central portions of said bit location for selectively driving the flux in said central portions to a first flux condition, means coupled to said central portions of said bit locations for driving the flux in said central portion to a second flux condition, and means coupled to said second end portions of said bit locations for detecting the switching of flux in the central portions thereof from said first to said second flux condition.

3. A magnetic memory including a memory plane, said memory plane comprising a material having substantially rectangular hysteresis characteristics, said memory plane including a linear array of holes therein, said holes being arranged in groups of six for defining bit locations thereabout, first drive means including a first conductor threaded through the first and fourth holes of each group of six holes for switching the flux in each of the legs therebetween from a first to a second flux condition in response to a pulse of a first polarity applied by said first drive means, second drive means including a plurality of second conductors each threaded through the second and third holes of a different one of said groups of holes for selectively inhibiting the switching of flux in the legs therebetween in response to a second polarity plus applied by said second drive means coincident with a pulse of said first polarity applied by said first drive means, and means including a plurality of third conductors each threaded through the fifth and sixth holes of a different one of said groups of holes for detecting flux switched in the magnetic leg between said fifth and sixth holes in response to a pulse of a second polarity applied by said first drive means.

4. A magnetic memory in accordance with claim 3 wherein the flux-carrying legs between the second and third holes of each of said groups of holes have a first minimum cross-sectional area, and the legs between the remaining holes of each of said groups of holes have equal minimum cross-sectional areas substantially half said first minimum cross-sectional area.

5. A magnetic memory in accordance with claim 4 wherein each of said first, second, and third conductors threads in opposite senses the corresponding two holes of each bit location threaded thereby.

6. A magnetic memory including a memory plane, said memory plane comprising a material having substantially rectangular hysteresis characteristics, said memory plane including a matrix of holes therein, said matrix of holes including a plurality of rows each subdivided into groups of six for defining bit locations thereabout, first drive means including a plurality of first conductors each threaded through the first and fourth holes of each group of holes of a single row for switching the flux in each of the legs therebetween from a first to a second flux condition in response to a pulse of a first polarity applied by said first drive means, second drive means including a plurality of second conductors each threaded through the second and third holes of the corresponding groups of holes in different rows for selectively inhibiting the switching of flux in the legs therebetween in response to a second polarity pulse applied by said second drive means coincident with a pulse of said first polarity applied by said first drive means, and means including a plurality of third conductors each threaded through the fifth and sixth holes of the corresponding groups of holes in different rows for detecting flux switched in the magnetic legs between said fifth and sixth holes in response to a pulse of a second polarity applied by said first drive means.

7. A magnetic memory in accordance with claim 6 wherein the flux-carrying legs between the second and third holes of each of said groups of holes have a first minimum cross-sectional area, and the legs between the remaining holes of each of said groups of holes have equal minimum cross-sectional areas substantially half said first minimum cross-sectional area.

8. A magnetic memory in accordance with claim 7 wherein each of said first, second, and third conductors threads in opposite senses the corresponding two holes of each associated bit location threaded thereby.

References Cited

Kahn et al.—"Multipath Transfer circuits" IBM Technical Disclosure Bulletin, vol. 2, No. 3, October 1959.

Russell—"Multipath Memory Device" IBM Technical Disclosure Bulletin, vol. 3, No. 10, March 1961.

BERNARD KONICK, *Primary Examiner.*

R. MORGANSTERN, *Assistant Examiner.*